United States Patent
Kaneko et al.

(10) Patent No.: US 11,017,246 B2
(45) Date of Patent: May 25, 2021

(54) IMAGE PROCESSING DEVICE AND IMAGE PROCESSING METHOD

(71) Applicant: CLARION CO., LTD., Saitama (JP)

(72) Inventors: Takayuki Kaneko, Saitama (JP);
Mamoru Kubota, Sagamihara (JP);
Shunsuke Kondo, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/854,465

(22) Filed: Apr. 21, 2020

(65) Prior Publication Data

US 2020/0334474 A1 Oct. 22, 2020

(30) Foreign Application Priority Data

Apr. 22, 2019 (JP) .............................. JP2019-081069

(51) Int. Cl.
*G06K 9/00* (2006.01)
*G06T 7/62* (2017.01)
*B60R 11/04* (2006.01)

(52) U.S. Cl.
CPC .......... *G06K 9/00812* (2013.01); *B60R 11/04* (2013.01); *G06K 9/00798* (2013.01); *G06T 7/62* (2017.01); *B60R 2300/806* (2013.01); *G06T 2207/30264* (2013.01)

(58) Field of Classification Search
CPC .. G06K 9/00812; G06K 9/00798; G06T 7/62; G06T 2207/30264; B60R 11/04; B60R 2300/806; B62D 15/0285; G08G 1/168
See application file for complete search history.

(56) References Cited

U.S. PATENT DOCUMENTS

| 9,378,425 B2 * | 6/2016 | Muramatsu ........ G06K 9/00812 |
| 10,389,981 B2 * | 8/2019 | Diegmann ................ G06T 7/12 |
| 10,713,509 B1 * | 7/2020 | Lei ............................ B60R 1/00 |

(Continued)

FOREIGN PATENT DOCUMENTS

| EP | 2 927 060 | 10/2015 |
| EP | 2 927 079 | 10/2015 |

(Continued)

OTHER PUBLICATIONS

Extended European Search Report dated Sep. 3, 2020 in corresponding European Patent Application No. 20169492.4.

*Primary Examiner* — James M Pontius
(74) *Attorney, Agent, or Firm* — Wenderoth, Lind & Ponack, L.L.P.

(57) ABSTRACT

An image processing device includes a sideline detector configured to detect sidelines of boundary lines of parking sections next to each other in a vehicle width direction by an edge detection process to an image, each of the sidelines being a pair of a rising edge and a falling edge, and to acquire an end point of each of the sidelines at which the pair is not detected, a rear-end edge identifying part configured to identify a rear-end edge of the parking section based on an end point away from the vehicle among the end points acquired by the sideline detector, and a parking frame setting portion configured to identify the parking section based on the two sidelines detected by the sideline detector and the rear-end edge identified by the rear-end edge identifying part, and to set a parking frame based on the parking section.

10 Claims, 9 Drawing Sheets

(56) References Cited

U.S. PATENT DOCUMENTS

| | | | |
|---|---|---|---|
| 2004/0204807 A1* | 10/2004 | Kimura | B62D 15/028 701/36 |
| 2009/0207045 A1* | 8/2009 | Jung | G06K 9/00798 340/932.2 |
| 2010/0231717 A1* | 9/2010 | Sasaki | G06T 7/80 348/148 |
| 2010/0283632 A1* | 11/2010 | Kawabata | G08G 1/165 340/932.2 |
| 2011/0074957 A1* | 3/2011 | Kiyohara | G06K 9/342 348/148 |
| 2011/0216194 A1* | 9/2011 | Kosaki | H04N 7/18 348/148 |
| 2012/0161983 A1* | 6/2012 | Yao | B62D 15/0285 340/932.2 |
| 2013/0265429 A1* | 10/2013 | Yoon | G08G 1/14 348/148 |
| 2014/0354452 A1* | 12/2014 | Okuyama | B62D 15/028 340/932.2 |
| 2014/0355822 A1* | 12/2014 | Choi | G06K 9/00812 382/103 |
| 2015/0097956 A1* | 4/2015 | Torii | G06K 9/00812 348/148 |
| 2015/0179075 A1* | 6/2015 | Lee | G08G 1/165 340/932.2 |
| 2015/0291031 A1* | 10/2015 | Morimoto | G06K 9/00812 701/70 |
| 2015/0317526 A1* | 11/2015 | Muramatsu | G06K 9/00798 348/148 |
| 2015/0375742 A1* | 12/2015 | Gebert | B62D 15/027 701/23 |
| 2016/0005316 A1* | 1/2016 | Lee | H04N 5/23238 348/38 |
| 2016/0343139 A1* | 11/2016 | Diegmann | G06T 7/12 |
| 2017/0129486 A1* | 5/2017 | Nakada | B60W 10/20 |
| 2018/0086381 A1* | 3/2018 | Hoffman, Jr. | B62D 15/0285 |
| 2018/0120851 A1* | 5/2018 | Shin | G01S 17/931 |
| 2018/0345955 A1* | 12/2018 | Kim | B60W 30/06 |
| 2019/0084618 A1* | 3/2019 | Numata | B62D 15/0275 |
| 2019/0094871 A1* | 3/2019 | Sugano | G05D 1/0214 |
| 2020/0074192 A1* | 3/2020 | Ogata | G06K 9/4604 |
| 2020/0094816 A1* | 3/2020 | Krekel | G06T 7/62 |
| 2020/0189653 A1* | 6/2020 | Hirata | B60R 99/00 |
| 2020/0193189 A1* | 6/2020 | Okada | G06K 9/00201 |
| 2020/0193193 A1* | 6/2020 | Okada | G06K 9/4676 |
| 2020/0265605 A1* | 8/2020 | Kaneko | G06T 7/73 |
| 2020/0290600 A1* | 9/2020 | Kuwahara | G06K 9/00798 |
| 2020/0344448 A1* | 10/2020 | Kaneko | G06T 7/73 |
| 2020/0353866 A1* | 11/2020 | Okubo | B60R 99/00 |
| 2020/0369262 A1* | 11/2020 | Suzuki | B60R 21/00 |

FOREIGN PATENT DOCUMENTS

| | | |
|---|---|---|
| EP | 3 650 286 | 5/2020 |
| EP | 3 696 723 | 8/2020 |
| JP | 2018-190220 | 11/2018 |
| WO | 2018/105179 | 6/2018 |
| WO | 2018/207782 | 11/2018 |
| WO | 2019/008757 | 1/2019 |
| WO | 3 553 744 | 10/2019 |

\* cited by examiner

IMAGE PROCESSING DEVICE AND IMAGE PROCESSING METHOD

CROSS-REFERENCE TO RELATED APPLICATION

The present application is based on and claims a priority benefit of Japanese patent application No. 2019-081069, filed on Apr. 22, 2019, the disclosure of which is hereby incorporated herein by reference in its entirety.

BACKGROUND

This disclosure relates to an image processing device and an image processing method.

A parking section detection apparatus which automatically detects a parking section partitioned for parking a vehicle based on an image captured by cameras is taught by, for example, JP2018-190220A. Such a parking section is partitioned by boundary lines such as white lines which extend in a vehicle longitudinal direction. The apparatus automatically detects the parking section by detecting the boundary lines.

SUMMARY

Although the boundaries of the parking section in a vehicle width direction are defined by the above boundary lines, a method of identifying a rear end of the parking section in the vehicle longitudinal direction has not been established. For example, when a vehicle is automatically parked in the parking section, it is necessary to properly identify the rear end of the parking section (forward end portion in traveling direction during parking operation (end portion corresponding to rear end of vehicle during reverse parking operation)). It is specifically necessary to identify the rear end of the parking section when the rear end of the parking section is not provided with a member, which physically stops the traveling of the vehicle, such as a wheel stopper block.

An object of the present disclosure is, therefore, to provide an image processing device and an image processing method capable of properly identifying the rear end of the parking section.

To achieve the above object, a first aspect of this disclosure describes an embodiment of an image processing device that sets a parking frame of a parking target corresponding to a parking section for a vehicle based on an image captured by a camera mounted on the vehicle. The device includes a sideline detector configured to detect sidelines that are boundary lines of parking sections next to each other in a vehicle width direction by an edge detection process to the image, each of the sidelines being a pair of a rising edge and a falling edge, and to acquire an end point of each of the sidelines at which the pair is not detected; a rear-end edge identifying part configured to identify a rear-end edge of the parking section based on an end point away from the vehicle among the end points acquired by the sideline detector; and a parking frame setting portion configured to identify the parking section based on the two sidelines detected by the sideline detector and the rear-end edge identified by the rear-end edge identifying part, and to set the parking frame based on the parking section.

A second aspect of this disclosure describes an embodiment of an image processing method which comprises an image processing method that sets a parking frame of a parking target corresponding to a parking section for a vehicle based on an image captured by a camera mounted on the vehicle. The method includes detecting sidelines that are boundary lines of parking sections next to each other in a vehicle width direction by an edge detection process to the image, each of the sidelines being a pair of a rising edge and a falling edge, and acquiring an end point of each of the sidelines at which the pair is not detected; identifying a rear-end edge of the parking section based on an end point away from the vehicle among the acquired end points; and identifying the parking section based on the detected two sidelines and the identified rear-end edge, and setting the parking frame based on the parking section.

DETAILED DESCRIPTION

With respect to the use of plural and/or singular terms herein, those having skilled in the art can translate from the plural to the singular and/or from the singular to the plural as is appropriate to the context and/or application. The various singular/plural permutations may be expressly set forth herein for sake of clarity.

Hereinafter, an embodiment of an image processing device and an image processing method of the present disclosure will be described with reference to the drawings.

Figure 1:
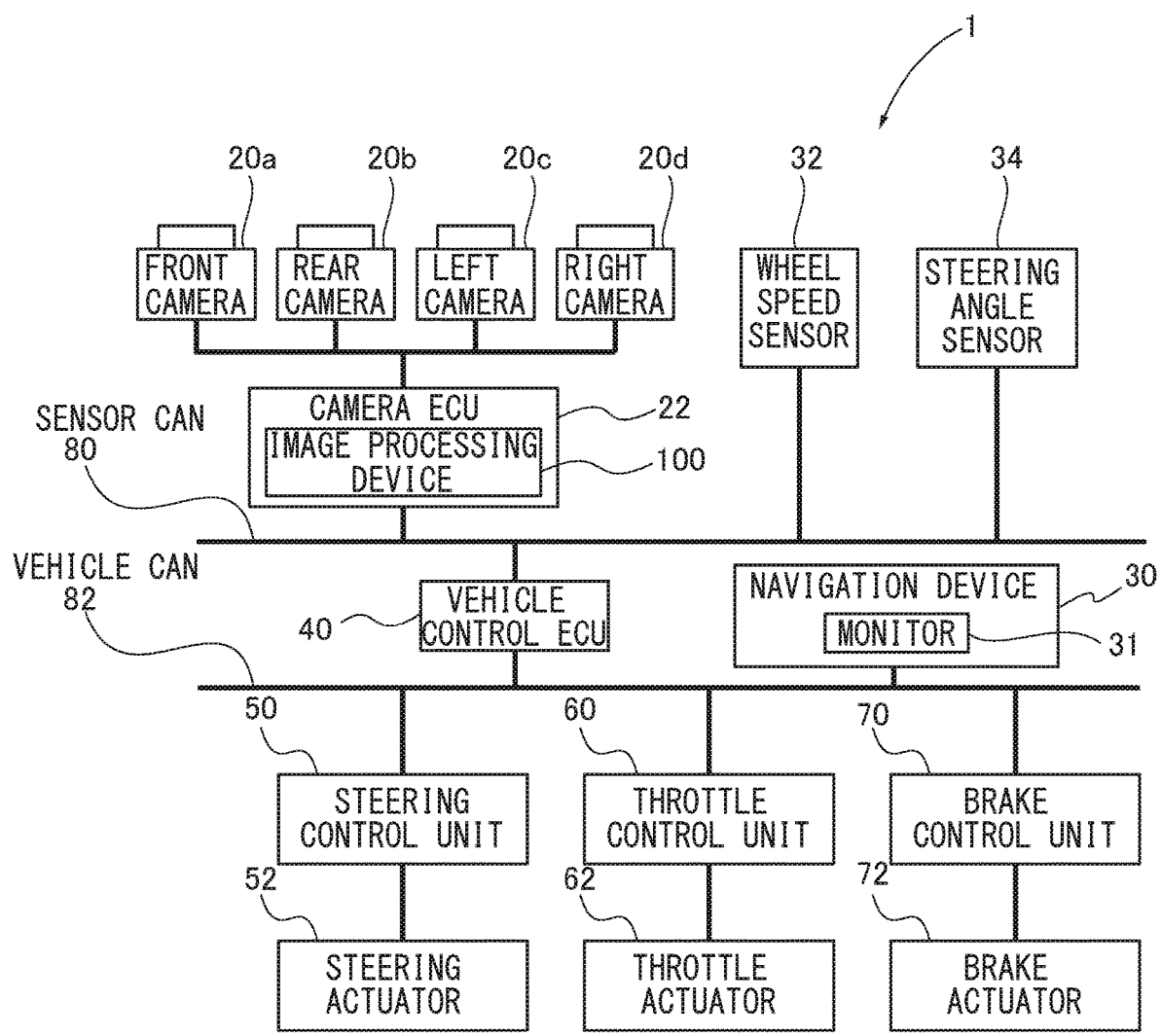
FIG. 1 is a block diagram showing a schematic configuration of a parking assist apparatus to which an embodiment of an image processing device of the present disclosure is applied.
Figure 2:
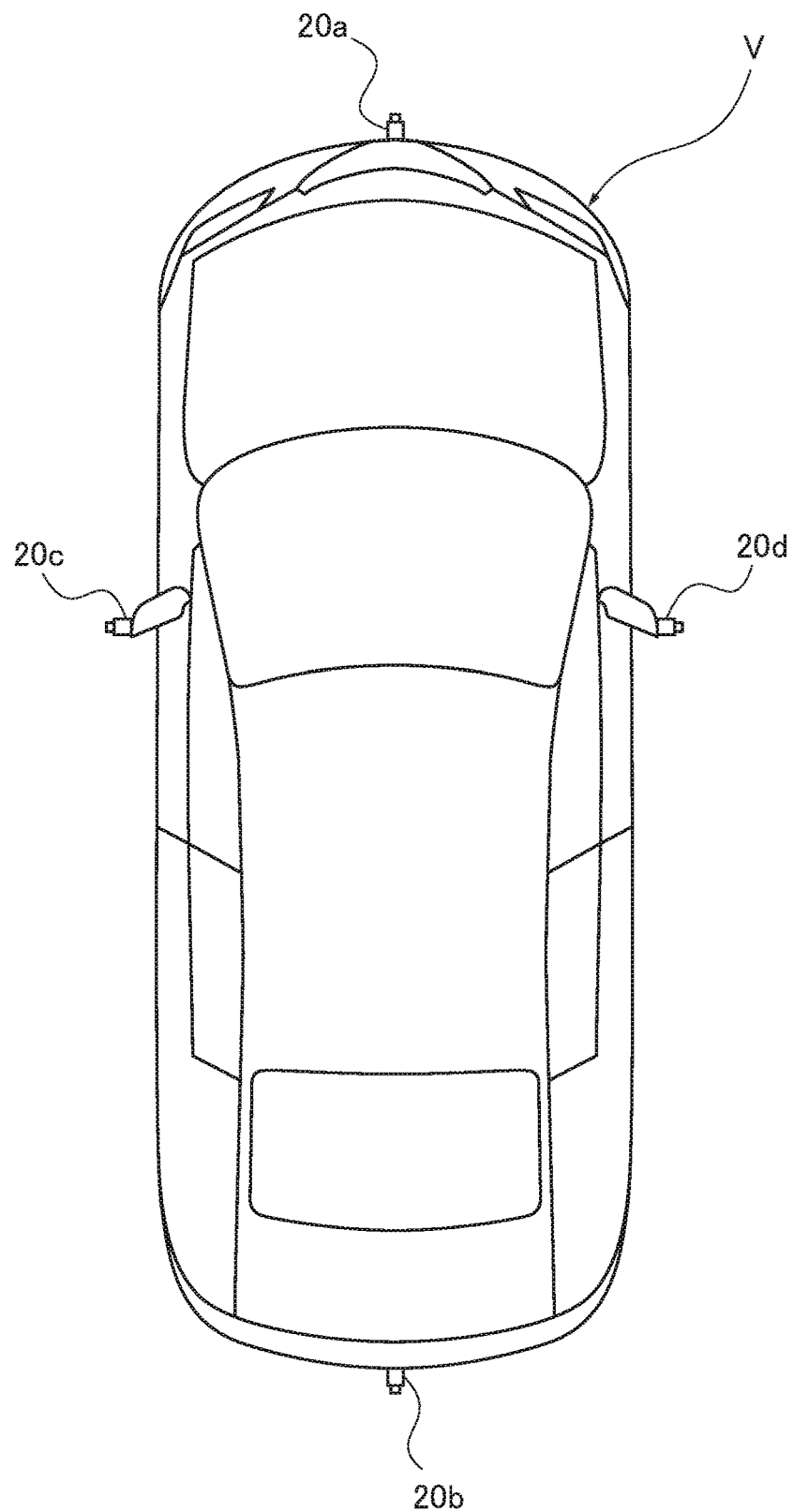
FIG. 2 is a schematic view showing an example of an arrangement of cameras (i.e., front camera, rear camera, left camera, and right camera) provided to the parking assist apparatus.

FIG. 1 is a block diagram showing a schematic configuration of a parking assist apparatus 1 to which an embodiment of an image processing device 100 of the present disclosure is applied. FIG. 2 is a schematic view showing an example of an arrangement of cameras 20 (i.e., front camera 20a, rear camera 20b, left camera 20c, and right camera 20d) provided to the parking assist apparatus 1.

The parking assist apparatus 1 shown in FIG. 1 is installed in a vehicle V (shown in FIG. 2) to carry out a parking assist operation. Specifically, the parking assist apparatus 1 is configured to detect a parking section of a parking area around the vehicle V based on images captured by the cameras (imaging devices) 20 of FIG. 2, and to set a parking frame corresponding to the detected parking section. The parking assist apparatus 1 then outputs signals to allow a vehicle control unit ECU 40 to guide the vehicle V to the parking frame.

As illustrated in FIG. 1, the parking assist apparatus 1 includes a front camera 20a, a rear camera 20b, a left camera 20c, and a right camera 20d as well as a camera ECU 22. The parking assist apparatus 1 further includes a navigation device 30, a wheel speed sensor 32, and a steering angle sensor 34.

As illustrated in FIG. 2, the front camera 20a is installed at the front bumper of or the radiator grill of the vehicle V to capture an image in front of the vehicle V. The rear camera 20b is installed at the rear bumper of or the rear garnish of the vehicle V to capture an image behind the vehicle V. The left camera 20c is installed at the left-wing mirror of the vehicle V to capture a side view image on the left of the vehicle V. The right camera 20d is installed at the right-wing mirror of the vehicle V to capture a side view image on the right of the vehicle V.

Each of the front camera 20a, rear camera 20b, left camera 20c, and right camera 20d has a wide-angle lens or a fisheye lens capable of monitoring a wide angle range such as 180 degrees. With these four cameras 20a-20d, the parking assist apparatus 1 is able to monitor the omnidirectional area of the vehicle V including the road surface around the vehicle V.

Hereinafter, the four cameras 20a-20d may collectively be referred to as the "cameras 20".

The camera ECU 22 is configured mainly with a microcomputer including a Central Processing Unit (CPU), a Read-Only Memory (ROM), a Random Access Memory (RAM), a flash memory, and the like. The camera ECU 22 controls the cameras 20. Further, the camera ECU 22 includes the image processing device 100 configured to realize, based on the information acquired by the cameras 20, processes such as generating on an overhead image and detecting a parking section.

The navigation device (display) 30 is equipped with a monitor 31 to display images and a memory in which mapping data and the like is stored for navigation. The navigation device 30 navigates the vehicle V to a target point determined by a user of the navigation device 30 based on the stored mapping data and a current position of the vehicle V detected by a GPS or the like (not illustrated). Images during the navigation process are displayed on the monitor 31.

The wheel speed sensor 32 detects a wheel speed of the vehicle V. The wheel speed detected by the wheel speed sensor 32 is inputted to the vehicle control unit ECU 40.

The steering angle sensor 34 detects a steering angle of the vehicle V. When the vehicle V travels straight, the steering angle sensor 34 reads zero (0) degree (i.e., neutral position). The steering angle sensor 34 outputs a rotation angle with respect to the neutral position as the steering angle. The steering angle detected by the steering angle sensor 34 is inputted to the vehicle control unit ECU 40.

In addition to the vehicle control unit ECU 40, the parking assist apparatus 1 includes a steering control unit 50, a throttle control unit 60, and a brake control unit 70.

The vehicle control unit ECU 40 is configured mainly with a microcomputer including a Central Processing Unit (CPU), a Read-Only Memory (ROM), a Random Access Memory (RAM), a flash memory, and the like. The vehicle control unit ECU 40 is configured to realize various processes for assisting the vehicle V to be parked based on the detected information inputted from the camera ECU 22, the wheel speed sensor 32, and the steering angle sensor 34.

For example, when a driver presses a switch (not illustrated) to activate the parking assist apparatus 1, the vehicle control unit ECU 40 realizes an automatic parking process to automatically park the vehicle V at the parking section.

The steering control unit 50 drives a steering actuator 52 to control the steering angle of the vehicle V based on the information determined by the vehicle control unit ECU 40.

The throttle control unit 60 drives a throttle actuator 62 to control the throttle valve of the vehicle V based on the information determined by the vehicle control unit ECU 40.

The brake control unit 70 drives a brake actuator 72 to control the brake of the vehicle V based on the information determined by the vehicle control unit ECU 40.

The camera ECU 22, the wheel speed sensor 32, and the steering angle sensor 34 are connected with the vehicle control unit ECU 40 via a sensor Controller Area Network (sensor CAN® bus) 80 using a vehicle Local Area Network (LAN).

The steering control unit 50, the throttle control unit 60, and the brake control unit 70 are connected with the vehicle control unit ECU 40 via a vehicle CAN® bus 82 using a vehicle LAN.

Figure 3:
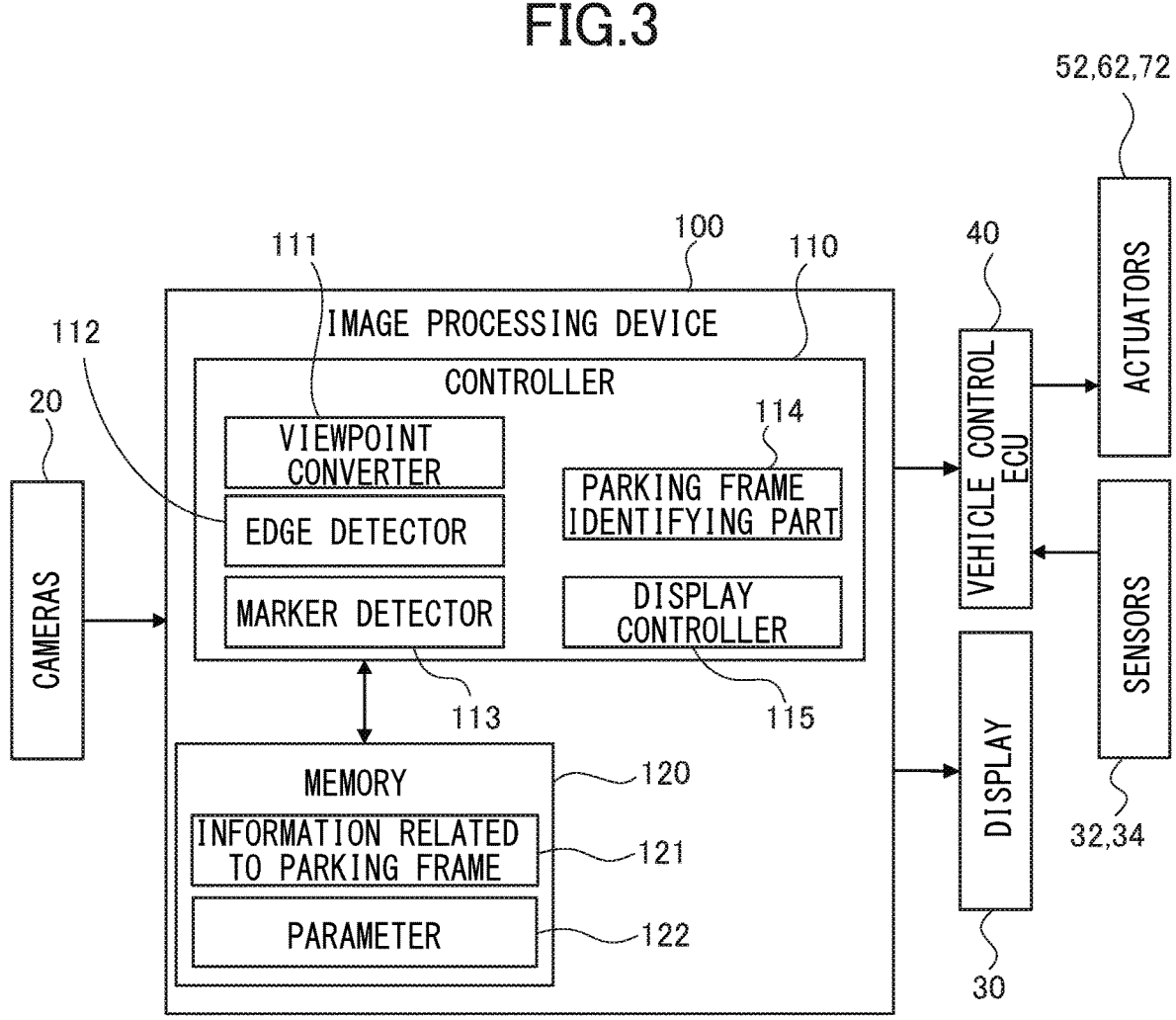
FIG. 3 is a functional block diagram showing a schematic configuration of the image processing device according to the embodiment.
Figure 4:
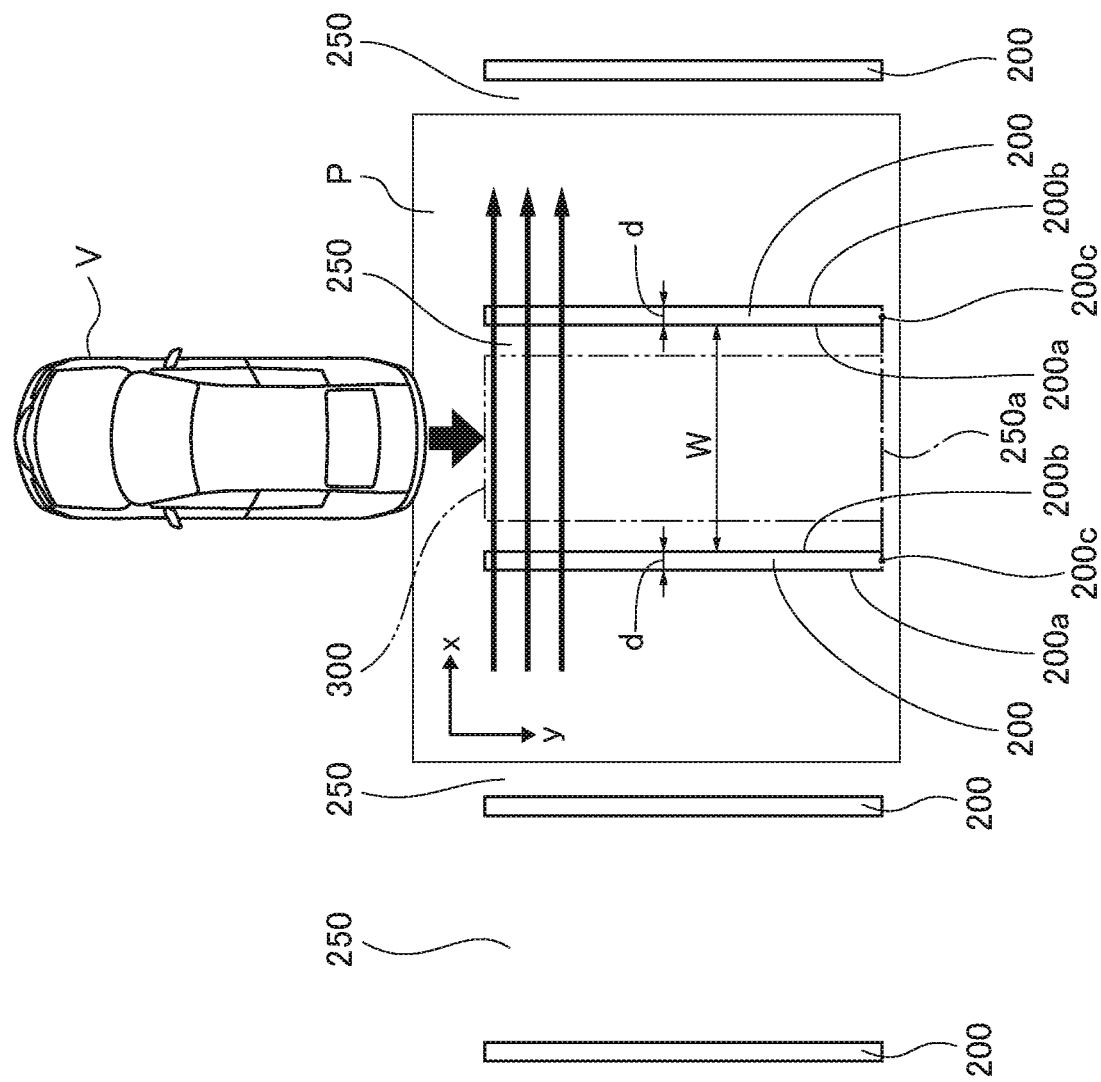
FIG. 4 is a schematic view showing a parking section and a parking frame.
Figure 5:
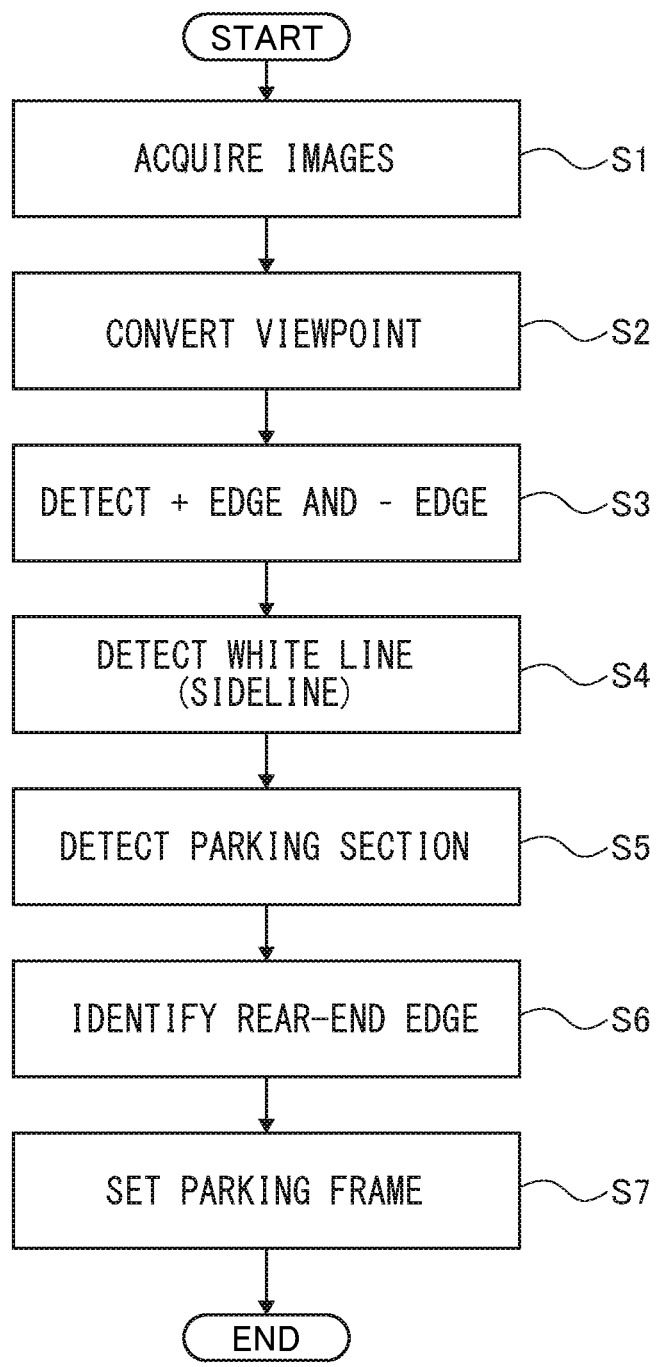
FIG. 5 is a flowchart showing a process of the image processing device shown in FIG. 3 to set the parking frame.
Figure 6:
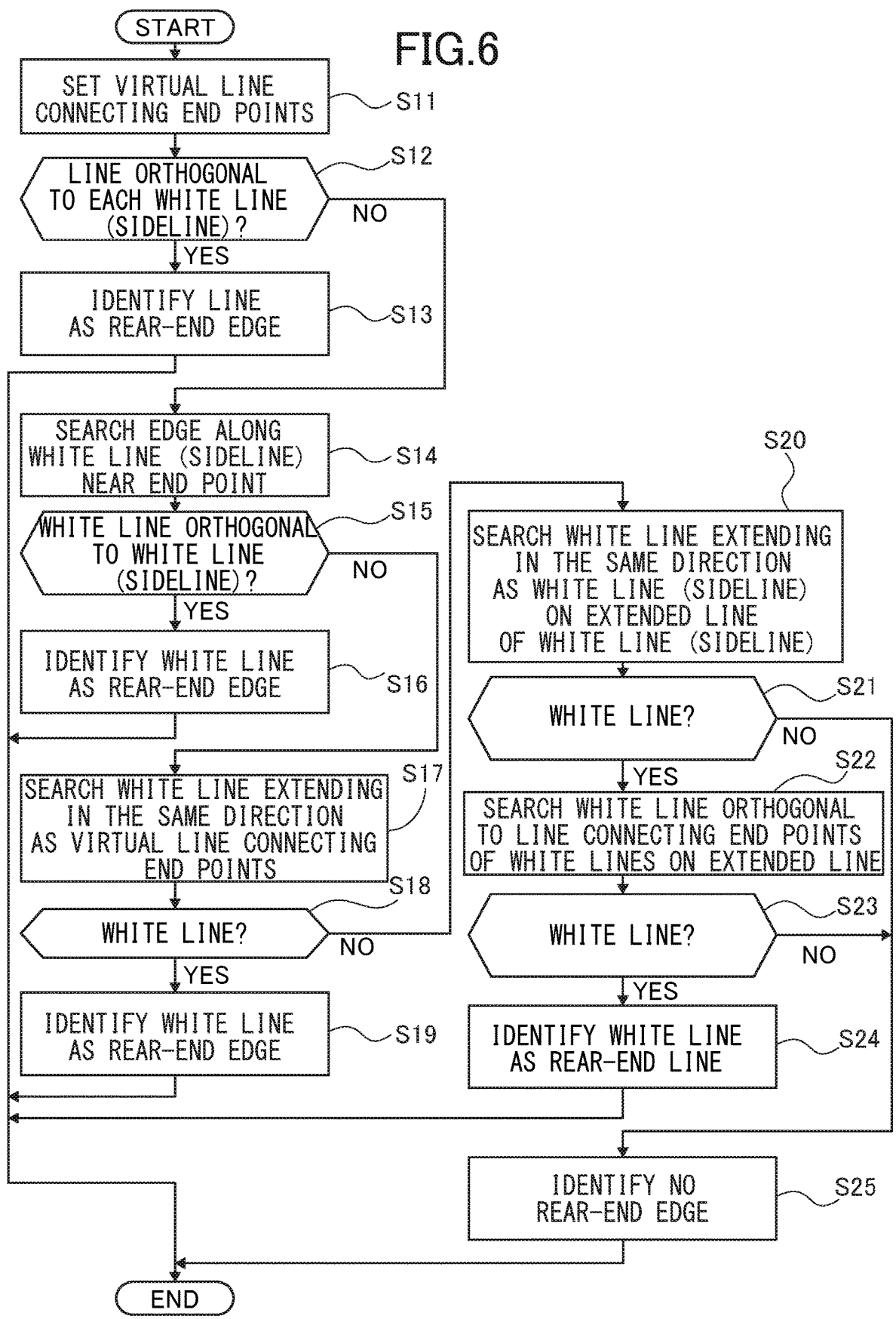
FIG. 6 is a flowchart showing details of a process to identify a rear-end edge shown in FIG. 5.

FIG. 3 is a functional block diagram showing a schematic configuration of the image processing device 100 according to the embodiment. FIG. 4 is a schematic view showing a parking section 250 and a parking frame 300. FIG. 5 is a flowchart showing a process of the image processing device 100 shown in FIG. 3 to set the parking frame 300. FIG. 6 is a flowchart showing details of a process to identify a rear-end edge shown in FIG. 5.

As illustrated in FIG. 4, the image processing device 100 sets the parking frame 300 in accordance with the detected parking section 250. The image processing device 100 then outputs the information 121 related to the parking frame 300 (e.g., position and shape of parking frame 300) to the vehicle control unit ECU 40.

After receiving the information 121 related to the parking frame 300, the vehicle control unit ECU 40 controls the steering actuator 52, the throttle actuator 62, and the brake actuator 72 in accordance with the preset program to guide the vehicle V to the set parking frame 300 while monitoring the wheel speed and the steering angle detected by the wheel speed sensor 32 and the steering angle sensor 34, respectively.

As illustrated in FIG. 3, the image processing device 100 includes a controller 110 and a memory 120.

The controller 110 is mainly configured with the CPU of the camera ECU 22 and controls the image processing device 100 entirely. In addition to the CPU, the controller 110 further includes a programmable logic device such as an FPGA and arithmetic elements (i.e., integrated circuit) such as an ASIC.

The memory 120 is mainly configured with a ROM, a RAM, a flash memory, and the like of the camera ECU 22. The memory 120 stores a control program (not illustrated). The control program is executed by the controller 110 during the startup of the image processing device 100 to allow the image processing device 100 to realize the functional configuration shown in FIG. 3. The memory 120 further stores parameters 122 including data of end points and the like, which are detected in the process of the controller 110 and the information 121 related to the parking frame 300.

As the image processing device 100 of the embodiment is expected to carry out high-speed processing, it is preferable to have arithmetic elements suitable to high-speed computing, such as an FPGA.

The controller 110 includes a viewpoint converter 111, an edge detector 112, a marker detector 113, a parking frame setting part 114, and a display controller 115.

In Step S1, the viewpoint converter 111 acquires images captured by the four cameras 20. As described above, the four cameras 20 capture images of the road surface around the vehicle V (hereinafter, the images captured by the cameras 20 are also referred to as "through images"). In Step S2, the viewpoint converter 111 converts the acquired through images into overhead images similar to the view of FIG. 4. The overhead images allow the driver to look down the subject vehicle V form the air above vehicle V.

It should be noted that the viewpoint converter 111 may synthesize the four overhead images which correspond to the through images captured by the cameras 20, and generate a single overhead image captured upon the vehicle V.

In Step S3, the edge detector 112 realizes a detection process to detect an edge by scanning an overhead image P (refer to FIG. 4) corresponding to an area behind the vehicle V in a predetermined direction (e.g., x-direction in FIG. 4 of vehicle width direction) and a y-direction orthogonal to the x-direction. The overhead image P is selected from the overhead images outputted from the viewpoint converter 111. The edge is a part of the image at which an intensity of contrast (pixel value (image signal value)) drastically changes in a spatially narrowed area.

Hereinafter, an edge (rising edge) at which an image signal value relatively changes from a small value to a large value is referred to as a positive edge and an edge (falling edge) at which an image signal value relatively changes from a large value to a small value is referred to as a negative edge. The edge detector 112 detects both of the positive edge and the negative edge.

As a white line 200 of a boundary line of the parking section 250 is brighter (high brightness value) than other portions of the road surface, the edge detector 112 detects the positive edge at a part of the image which is changed from the road surface other than the white line 200 to the white line 200 and detects the negative edge at a part of the image which is changed from the white line 200 to the road surface other than the white line 200.

The color of the boundary line of the parking section 250 is not limited to white, and may be yellow. In the following description, the boundary line brighter than the road surface including the yellow boundary line other than the white boundary line is referred to as the white line. In addition, the white line does not include a boundary line darker than the road surface.

The edge detector 112 scans the image in the x-direction several times while shifting the detection position in the y-direction (longitudinal direction of vehicle V) orthogonal to the x-direction. When the edge detector 112 detects edges aligned in a predetermined direction, the edge detector 112 detects a line 200a of the positive edge extending in the predetermined direction. The edge detector 112 detects a line 200b of the negative edge similar to the line 200a of the positive edge.

The marker detector 113 detects a marker of a boundary of the parking section 250. In Step S4, the marker detector 113 detects the straight white line 200 having a predetermined length or more as the maker.

The marker detector 113 detects the white line 200 extending straight in a predetermined direction as a sideline of the boundary line of the parking sections 250 next to each other in the vehicle width direction based on the line 200a of the positive edge and the line 200b of the negative edge detected by the edge detector 112.

To be specific, the marker detector 113 determines, as the white line, a pair of the line 200a of the positive edge and the line 200b of the negative edge, which has a predetermined distance d therebetween and a predetermined length or more.

The value of the predetermined distance d is set to a typical width of the white line 200 used as the boundary line of the parking section 250, and also is set to a value having a range from the minimum value to the maximum value.

For example, when the marker detector 113 detects the line 200a of the positive edge only, and does not detect the line 200b of the negative edge within the predetermined distance d, the marker detector 113 determines no white line 200.

As such a condition, a part of the image which is changed from the shadow of the vehicle V projected on the road surface, for example, to a sunny place is anticipated. The marker detector 113 detects the line 200a of the positive edge at that part which is changed from the shadow to the sunny place, but detects no line 200b of the negative edge. The marker detector 113 therefore determines no white line 200.

Similarly, the marker detector 113 determines no white line 200 when the marker detector 113 detects the line 200b of the negative edge only. As an example when the marker detector 113 detects the line 200b of the negative edge only, a part of the image, which is changed from the sunny place to the shadow of the vehicle V projected on the road surface, for example, is anticipated. The marker detector 113 therefore determines no white line 200.

For example, when the shadow of a power pole is projected on a sunny road surface, although the marker detector 113 detects a pair of the line 200b of the negative edge and the line 200a of the positive edge at the predetermined distance d, the marker detector 113 determines no white line 200. As the shadow of the power pole is darker than the sunny road surface, the shadow of the power pole may be detected as a line darker than the road surface, but the dark line is not applicable to the white line 200 brighter than the road surface.

That is, the marker detector 113 determines the white line 200 when the marker detector 113 detects the line 200b of the negative edge after detecting the line 200a of the positive edge at the predetermined distance d, and determines no white line 200 when detecting the line 200a of the positive edge after detecting the line 200b of the negative edge at the predetermined distance d. The marker detector 113 thereby prevents the erroneous detection of the dark line of the shadow of the power pole as the white line 200, and is able to eliminate the erroneous detection of noise.

The line 200a of the positive edge and the line 200b of the negative edge detected by scanning in the x-direction extend in the direction orthogonal to the x-direction. The white line 200 determined by the line 200a of the positive edge and the line 200b of the negative edge is the boundary line, namely, the sideline of the parking section 250 in the vehicle width direction. This boundary line extends in the vehicle longitudinal direction.

The marker detector 113 detects the white lines 200 of the two sidelines in the overhead image P illustrated in FIG. 4. The marker detector 113 detects each end point 200c of the rear ends of each of the detected two white lines 200, and stores the detected end points 200c in the memory 120. The end point 200c of the white line 200 is a point at the end of the pair of the line 200a of the positive edge and the line 200b of the negative edge in the y-direction and a point at which the pair of the line 200a of the positive edge and the line 200b of the negative edge is not detected.

As described above, the edge detector 112 and the marker detector 113 realize the edge detection process to the overhead image P to detect the white line 200 of the sideline of the pair of the line 200a of the positive edge and the line 200b of the negative edge and to acquire the end point 200c of the white line 200 at which the pair of the line 200a of the positive edge and the line 200b of the negative edge is not detected. Accordingly, the edge detector 112 and the marker detector 113 are one example of a sideline detector and a rear-end edge identifying part.

When the white line 200 is disconnected due to the protrusion of the white line 200 from the overhead image P, the marker detector 113 does not determine, as the end point 200c of the white line 200, the point just before the white line 200 is disconnected.

Further, the marker detector 113 detects a width W between the two white lines 200, 200 next to each other, technically, a shortest distance between the edges of the two white lines 200, 200, that is, a distance from the line 200b of the negative edge of one white line 200 to the line 200a of the positive edge of the other white line 200. The marker detector 113 determines whether the width W has a measurement suitable for parking the vehicle V.

To be specific, the marker detector 113 determines whether or not the width W of the two white lines 200, 200 next to each other has a typical width larger than the width of the vehicle V as the parking section 250. In Step S5, when the marker detector 113 determines the width W has the typical width as the parking section 250, the marker detector 113 determines the parking section 250 of the parking space with the two white lines 200, 200 as the sidelines.

On the other hand, when the marker detector 113 determines the width W does not have the typical width as the parking section 250, the marker detector 113 determines no parking section 250 with the two white lines 200, 200 as the sidelines.

The edge detector 112 realizes the edge detection process to scan the overhead image P in the direction different from x-direction, and to detect the positive edge and the negative edge extending in the direction different from the white line 200. The marker detector 113 identifies the rear-end edge of the parking section 250 based on the end points of the white lines 200 away from the vehicle V among the acquired end points of the white line 200.

That is, in Step S6, when the edge detector 112 and the marker detector 113 determine the parking section 250 with the two white lines 200, 200 as the sidelines, the edge detector 112 and the marker detector 113 realize the process to identify the rear-end edge of the determined parking section 250 (FIG. 6).

In Step S11, the marker detector 113 virtually connects the end points 200c of the two white lines 200, 200 stored in the memory 120 with a straight line 250a. In Step S12, the marker detector 113 determines whether or not the line 250a is orthogonal to each white line 200.

For example, as illustrated in FIG. 4, when the parking section 250 is partitioned by the white lines 200 (sidelines) of the boundary lines only in the vehicle width direction, and the positions of the end points 200c along the longitudinal direction of the two white lines 200, 200 are aligned, the marker detector 113 determines the line 250a is orthogonal to the white line 200 (Yes in Step S12).

Here, in Step S13, the marker detector 113 identifies the line 250a as the rear-end edge of the parking section 250 to complete the process to identify the rear-end edge.

Figure 7:
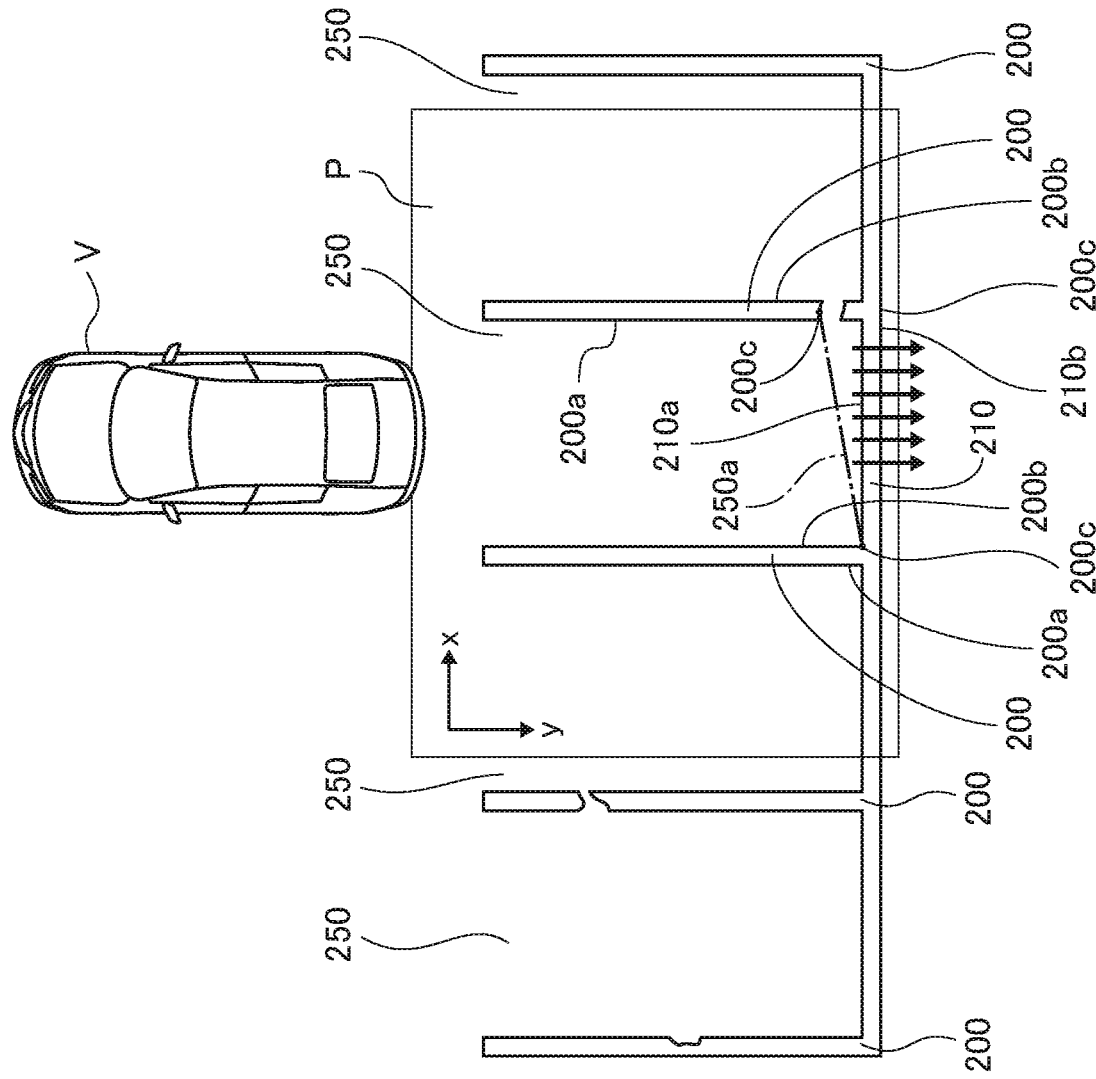
FIG. 7 is a schematic view showing parking sections partitioned by white lines of sidelines and white lines of rear-end lines and parking sections having partly broken white lines due to blurred white lines.

FIG. 7 is a schematic view showing the parking sections 250 partitioned by the white lines 200 of sidelines and the white lines 210 of the rear-end lines and the parking sections 250 having partly disconnected white lines 200 due to blurred white lines.

As illustrated in FIG. 7, for example, when the parking section 250 is partitioned by the white lines 200 of the sidelines and the white line 210 of the rear-end line which is orthogonal to the white lines 200, but the white line 200 of the sideline (right white line 200 in FIG. 7) is partially disconnected due to a blurred portion, the disconnected portion is stored in the memory 120 as the end point 200c.

The end points 200c, 200c of the two white lines 200, 200 along the longitudinal direction are misaligned. The marker detector 113 therefore determines the line 250a virtually connecting the end points of the two white lines 200, 200 is not orthogonal to the white line 200 (No in Step S12).

In Step S14, the edge detector 112 scans around both end points 200c in the direction (y-direction) orthogonal to the first scanning direction (x-direction), that is, in the direction along the white line of the sideline to search the line 210a of the positive edge and the line 210b of the negative edge, and the marker detector 113 searches a pair of the line 210a of the positive edge and line 210b of the negative edge.

In Step S15, the marker detector 113 detects the pair of the line 210a of the positive edge and the line 210b of the negative edge at the predetermined distance d to determine the white line 210 which is orthogonal to the white lines 200, similar to the detection of the white line 200 of the sideline.

When the white line 210 which is orthogonal to the white lines 200 is detected (YES in Step S15), the marker detector 113 identifies the rear-end edge of the parking section 250 (Step S16) to complete the process to identify the rear-end edge.

Figure 8:
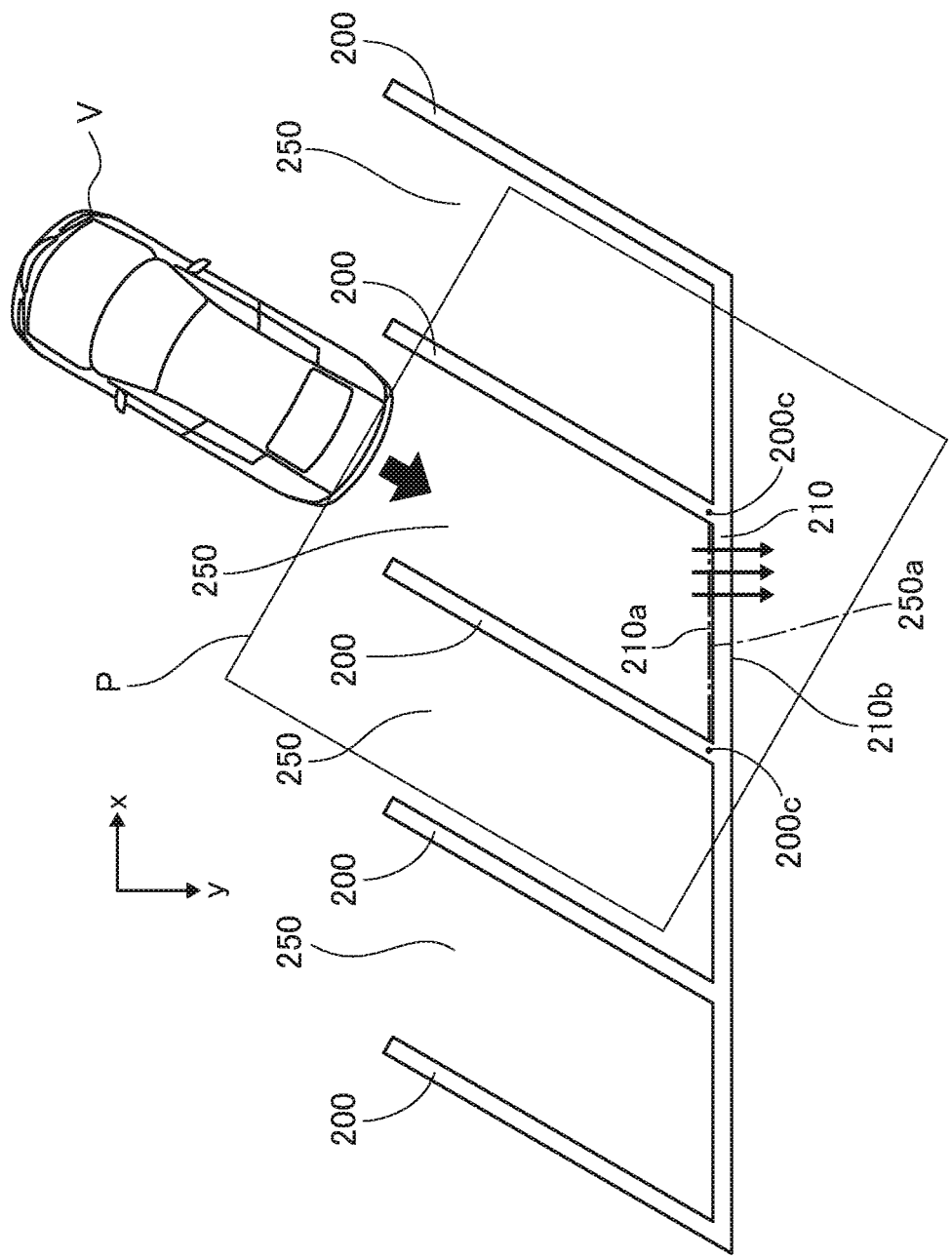
FIG. 8 is a schematic view showing parking sections each partitioned by two white lines (sidelines) of boundary lines in a vehicle width direction and a white line of a rear-end line connecting rear end points of the two white lines.

FIG. 8 is a schematic view showing the parking sections 250 each partitioned by the two white lines 200 (sidelines) of the boundary lines in the vehicle width direction and the white line 210 of the rear-end line connecting the rear-end points of the two white lines 200.

As illustrated in FIG. 8, for example, when the parking sections 250 are arranged in a direction inclined in the vehicle width direction, that is, each of the parking sections 250 are partitioned by the two white lines 200 (sidelines) of the boundary lines in the vehicle width direction and the white line 210 of the rear-end line formed by connecting the rear-end points 200c, 200c of the two white lines 200, the white line 210, which is orthogonal to the white lines 200 of the sidelines, is not detected (NO in Step S15).

In Step S17, the marker detector 113 searches the white line 210 extending along the line 250a set in Step S11 of FIG. 6 around both end points 200c.

To be specific, in Step S17, the edge detector 112 scans around both end points 200c in the direction orthogonal to the line 250a (direction orthogonal to x-direction) to search the line 210a of the positive edge and the line 210b of the negative edge, and the marker detector 113 searches the pair of the line 210a of the positive edge and the line 210b of the negative edge.

In Step S18, the marker detector 113 detects the pair of the line 210a of the positive edge and the line 210b of the negative edge at the predetermined distance d to determine the white line 210, which is orthogonal to the white lines 200, similar to the detection of the white line 200 of the sideline.

When the marker detector 113 detects the white line 210 extending along the line 250a (YES in Step S18), the marker detector 113 identifies the white line 210 as the rear-end edge of the parking section 250 (Step S19) to complete the process to identify the rear-end edge.

Figure 9:
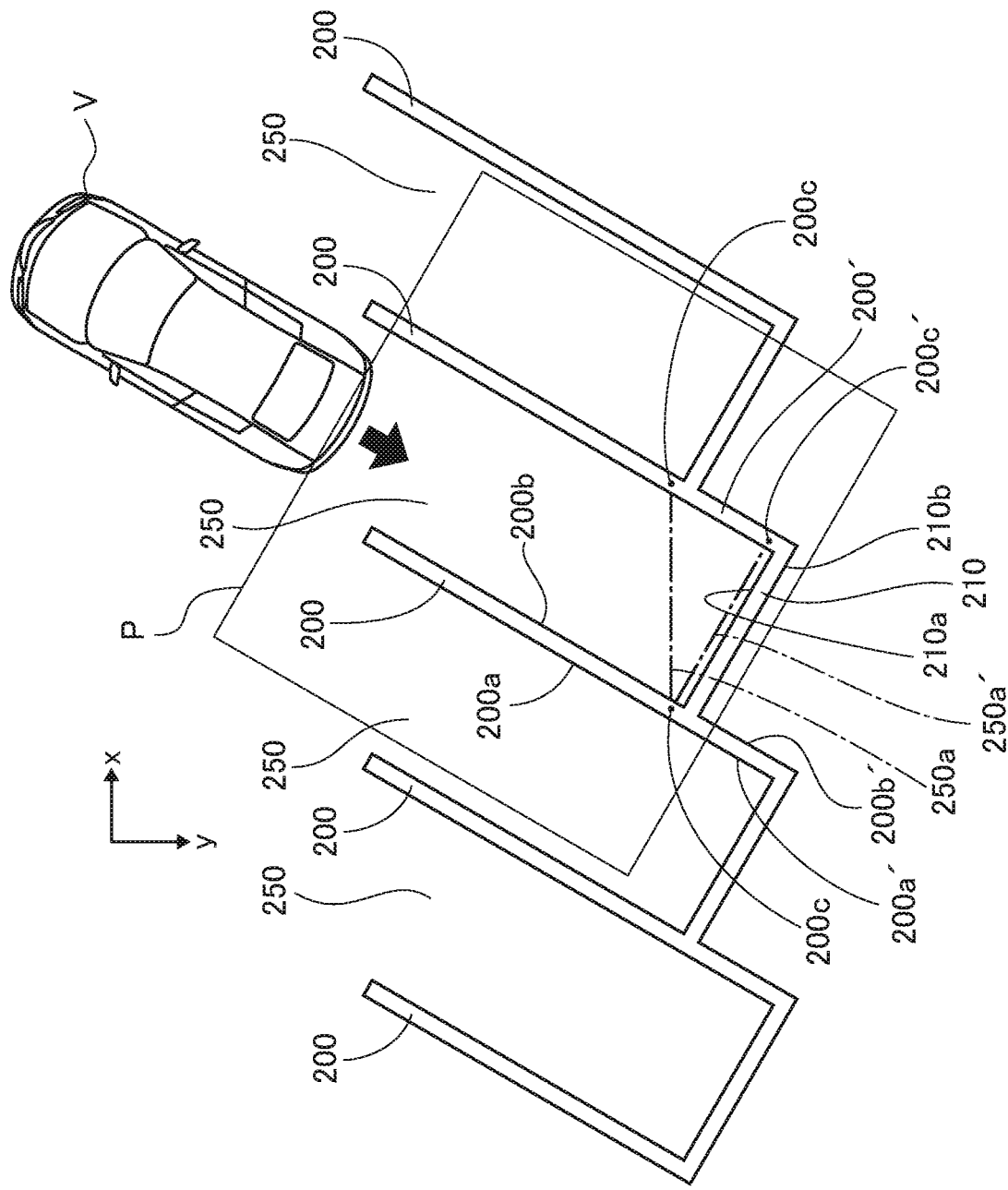
FIG. 9 is a schematic view showing parking sections, which are arranged in a direction inclined to the vehicle width direction, and each partitioned by white lines of sidelines and a white line of a rear-end line orthogonal to the white lines, and showing the parking sections in which the white lines of the rear-end lines of the parking sections are connected to middles of the white lines of the sidelines of the neighboring parking sections.

FIG. 9 is a schematic view showing the parking sections 250, which are arranged in a direction inclined to the vehicle width direction, and each partitioned by the white lines 200 of the sidelines and the white line 210 of the rear-end line orthogonal to the white lines 200, and showing the parking sections 250 in which the white lines 210 of the rear-end lines of the parking sections 250 are connected to middles of the white lines 200 of the sidelines of the neighboring parking sections 250

As illustrated in FIG. 9, for example, when the parking sections 250 are arranged in the direction inclined to the vehicle width direction, and each of the parking sections 250 is partitioned by the white lines 200 of the sidelines and the white line 210 of the rear-end line, which is orthogonal to the white lines 200 and shows the rear-end edge of the parking section 250, the white line 210 extending along the line 250a is not detected (No in Step S18).

That is, in the parking section 250, the white line 210 of the rear-end line of the parking section 250 is connected to the middle of the white line 200 of one of the sidelines (right white line 200 in FIG. 9) of the neighboring parking section 250. The line 200b of the negative edge of the white line 200 is not detected in the part at which the white line 210 is connected. Thus, the end point 200c of the white line 200 is detected just before the part at which the white line 210 is connected.

As illustrated in FIG. 9, the virtual line 250a connecting the end points 200c is similar to the line 250a in FIG. 8, and the white line 210 extending along the line 250a is not detected (NO in Step S18).

In Step S20, the marker detector 113 searches a white line 200' (extended line) extending in the same direction as the white line 200 on the extended line of the white line 200 ahead of the end point 200c.

To be specific, in Step S20, the edge detector 112 scans ahead of the end point 200c in the direction orthogonal to the white line 200 to search a line 200a' of the positive edge and a line 200b' of the negative edge extending in the extending direction of the white line 200, and the marker detector 113 searches a pair of the line 200a' of the positive edge and the line 200' of the negative edge.

In Step S21, the marker detector 113 detects the pair of the line 200a' of the positive edge and the line 200b' of the negative edge at the predetermined distance d to determine the white line 200' of the extended line of the white line 200, similar to the detection of the white line 200.

When the marker detector 113 detects the white line 200' of the extended line of the white line 200 (YES in Step S21), the marker detector 113 searches the white line 210 which is orthogonal to the white lines 200 and along a virtual line 250a' connecting an end point 200c' of the extended white line 200' and the end point 200c of the white lines 200 (left white line 200 in FIG. 9) of the neighboring sideline (Step S22).

To be specific, in Step S22, the edge detector 112 scans in the direction orthogonal to the virtual line 250a' to search the line 210a of the positive edge and the line 210b of the negative edge, and the marker detector 113 searches the pair of line 210a of the positive edge and the line 210b of the negative edge.

In Step S23, the marker detector 113 detects the pair of the line 210a of the positive edge and the line 210b of the negative edge at the predetermined distance d to determine the white line 210 along the line 250a', similar to the detection of the white line 200.

When the marker detector 113 detects the white line 210 which extends along the line 250a' and is orthogonal to the white lines 200 (YES in Step S23), the marker detector 113 identifies the white line 210 as the rear-end edge of the parking section 250 to complete the process to identify the rear-end edge.

On the other hand, when the marker detectors 113 detects no white line 200' of the extended line of the white line 200 (NO in Step S21) and no white line 210 extending along the line 250a' (NO in Step S23), the marker detector 113 completes the process to identify the rear-end edge without identifying the rear-end edge (Step S25).

As described above, when the rear-end edge is identified by the process to identify the rear-end edge of the parking section 250, the parking frame setting part 114 of the image processing device 100 sets the parking frame 300 (FIG. 4) partitioned by the two white lines 200, 200 of the sidelines, the identified rear-end edge, and a front-end edge arranged in parallel with the rear-end edge (Step S7). The length between the front-end edge and the rear-end edge along the white line 200 corresponds to a length of the vehicle V. The parking frame setting part 114 stores the information 121 related to the parking frame 300 in the memory 120 as well as outputs the information 121 related to the parking frame 300 to the vehicle control unit ECU 40.

The vehicle control unit ECU 40 which has acquired the information 121 related to the parking frame 300 guides the vehicle V to the parking frame 300 by the automatic parking process to automatically park the vehicle V.

The display controller 115 of the image processing device 100 superimposes the overhead image P and the set parking frame 300 on the monitor 31 of the navigation device 30. A driver is thereby able to visually recognize the vehicle V to be guided to the parking frame.

As described above, according to the image processing device 100 and the image processing method of the present embodiment, the parking frame 300 can be set by properly identifying the rear-end edge of the parking section.

That is, although the parking section 250 is the following parking sections (1) to (4), which are different from a typical parking section (e.g., parking section partitioned by white lines 200 of two sidelines and white line 210 of rear-end edge which are orthogonal to each other without being disconnected), the rear-end edge can be properly identified.

(1) The parking section 250 is partitioned by the white lines 200 of the sidelines only (FIG. 4).
(2) Although the white line 210 of the rear-end edge is set, a part of the white line 200 of the sideline is disconnected (FIG. 7).
(3) The parking section 250 is arranged in the direction inclined to the vehicle width direction, and the white line 210 of the rear-end edge is not orthogonal to the white lines 200 of the sidelines (FIG. 8).
(4) The parking sections 250 are arranged in the direction inclined to the vehicle width direction, and the white line 210 of the rear-end edge of the neighboring parking section 250 is connected to the middle of the white line 200 of the sideline (FIG. 9).

The parking frame 300 partitioned by the white lines 200 of the two sidelines and the white line 210 of the rear-end line can be properly set.

As the front-end line of the parking section 250 is less important than the rear-end line during the parking operation, the front-end line may be set by offsetting at the length of the vehicle V from the rear-end line in the direction of the sidelines. However, the front-end line may be identified by another method.

As the image processing device 100 and the image processing method of the present embodiment include the viewpoint converter 111 to realize the process to the overhead image acquired by the viewpoint conversion with the viewpoint converter 111, the white line 200 and the like can be calculated on the orthogonal coordinate system without considering perspective.

The image processing device 100 and the image processing method of the present embodiment are suitable as the process to the overhead image during the parking operation which changes moment by moment compared to the process to the through image before the viewpoint conversion whose size changes according to perspective because the calculation load can be controlled.

The image processing device and the image processing method of the present disclosure are not limited to the process to the overhead image, and may realize a process to a through image before the viewpoint conversion and an image to which another process is carried out.

The image processing device 100 and the image processing method are to sequentially identify the following parking sections 250 (1) to (4). However, the image processing device 100 and the image processing method of the present disclosure may identify any one of the parking sections 250 (1) to (4). The parking section 250 which cannot be conventionally identified can be thereby identified.

(1) The parking section 250 is partitioned by the white lines 200 of the sidelines only (FIG. 4).
(2) Although the white line 210 of the rear-end edge is set, a part of the white line 200 of the sideline is disconnected (FIG. 7).
(3) The parking section 250 is arranged in the direction inclined to the vehicle width direction, and the white line 210 of the rear-end edge is not orthogonal to the white lines 200 of the sidelines (FIG. 8).
(4) The parking sections 250 are arranged in the direction inclined to the vehicle width direction, and the white line 210 of the rear-end edge of the neighboring parking section 250 is connected to the middle of the white line 200 of the sideline (FIG. 9).

Although the present disclosure has been described in terms of an exemplary embodiment, it should not be limited thereto. It should be appreciated that variations or modifications may be made in the embodiments described by persons skilled in the art without departing from the scope of the present invention as defined by the following claims.

What is claimed is:

1. An image processing device for setting a parking frame of a parking target corresponding to a parking section for a vehicle based on an image captured by a camera mounted on the vehicle, the image processing device comprising:
    a processor; and
    a non-transitory computer-readable medium having stored thereon executable instructions that, when executed by the processor, cause the image processing device to function as:
    a marker detector configured to: (i) detect sidelines that are boundary lines of parking sections next to each other in a vehicle width direction by an edge detection process to the image, (ii) acquire an end point of each of the sidelines at which the sideline is not detected, and (iii) detect a rear-end edge of the parking section based on an end point away from the vehicle among the end points; and
    a parking frame setting portion configured to set the parking frame based on the sidelines and the rear-end edge detected by the marker detector.

2. The device according to claim 1, wherein the marker detector is configured to determine whether or not a virtual straight line connecting the two end points of the two sidelines is orthogonal to the two sidelines, and to identify the virtual straight line as the rear-end edge when determining that the virtual straight line is orthogonal to the two sidelines.

3. The device according to claim 1, wherein the marker detector is configured to determine whether or not a virtual straight line connecting the two end points of the two sidelines is orthogonal to the two sidelines, to search a straight line orthogonal to the two sidelines around the two end points of the two sidelines when determining that the virtual straight line is not orthogonal to the two sidelines, and to identify the straight line orthogonal to the two sidelines as the rear-end edge when detecting the straight line orthogonal to the two sidelines.

4. The device according to claim 1, wherein the marker detector is configured to search a straight line along a virtual straight line connecting the two end points of the two sidelines around the two end points of the two sidelines, and to identify the straight line as the rear-end edge when detecting the straight line along the virtual straight line.

5. The device according to claim 1, wherein the marker detector is configured to search an extended line along the sideline ahead of the end point of a first of the two sidelines, to search a straight line that is along a virtual straight line connecting an end point of the extended line and the end point of a second of the two sidelines and is orthogonal to the sidelines, and to identify the straight line as the rear-end edge when detecting the straight line that is along the virtual straight line and is orthogonal to the sidelines.

6. An image processing method for setting a parking frame of a parking target corresponding to a parking section for a vehicle based on an image captured by a camera mounted on the vehicle, the image processing method comprising:
    detecting sidelines that are boundary lines of parking sections next to each other in a vehicle width direction by an edge detection process to the image, acquiring an end point of each of the sidelines at which the sideline is not detected,
    and detecting a rear-end edge of the parking section based on an end point away from the vehicle among the end points; and
    setting the parking frame based on the sidelines and the rear-end edge which have been detected.

7. The method according to claim 6, further comprising determining whether or not a virtual straight line connecting the two end points of the two sidelines is orthogonal to the two sidelines, and identifying the virtual straight line as the rear-end edge when it is determined that the virtual straight line is orthogonal to the two sidelines.

8. The method according to claim 6, further comprising determining whether or not a virtual straight line connecting the two end points of the two sidelines is orthogonal to the two sidelines, searching a straight line orthogonal to the two sidelines around the two end points of the two sidelines when it is determined that the virtual straight line is not orthogonal to the two sidelines, and identifying the straight line orthogonal to the two sidelines as the rear-end edge when the straight line orthogonal to the two sidelines is detected.

9. The method according to claim 6, further comprising searching a straight line along a virtual straight line connecting the two end points of the two sidelines around the two end points of the two sidelines, and identifying the straight line as the rear-end edge when the straight line along the virtual straight line is detected.

10. The method according to claim 6, further comprising searching an extended line along the sideline ahead of the end point of a first of the two sidelines, searching a straight line that is along a virtual straight line connecting an end point of the extended line and the end point of a second of the two sidelines and is orthogonal to the sidelines, and identifying the straight line as the rear-end edge when the straight line that is along the virtual straight line and is orthogonal to the sidelines is detected.

* * * * *